Oct. 31, 1933.   F. L. SESSIONS   1,932,423
APPARATUS FOR ELECTRIC INDUCTION WELDING AND HEATING
Filed Aug. 22, 1929   3 Sheets-Sheet 2
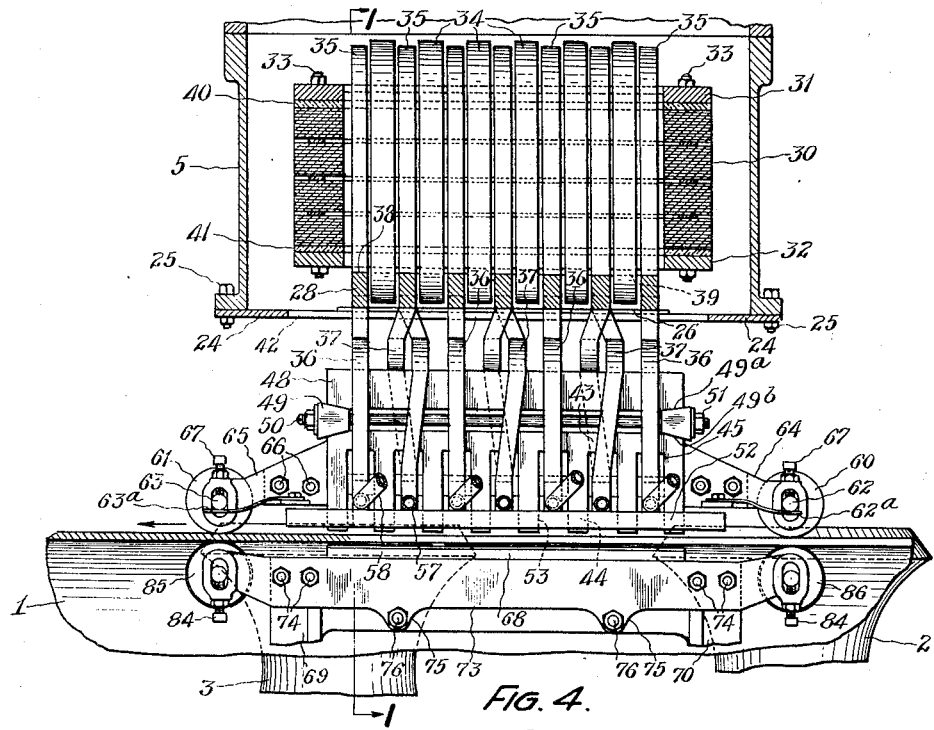
FIG. 4.
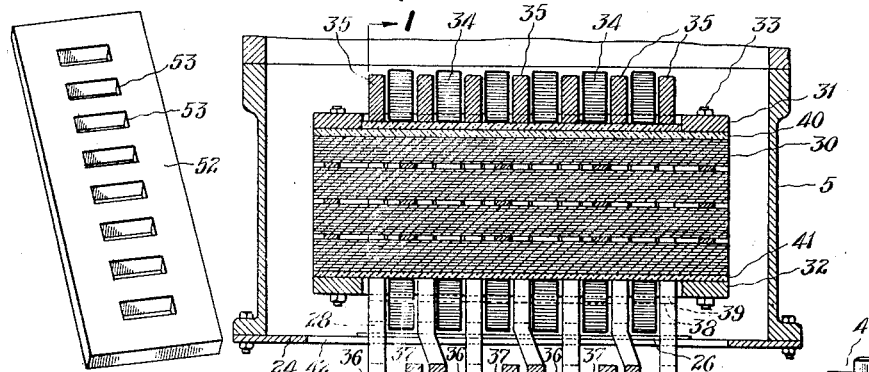
FIG. 7.   FIG. 6.
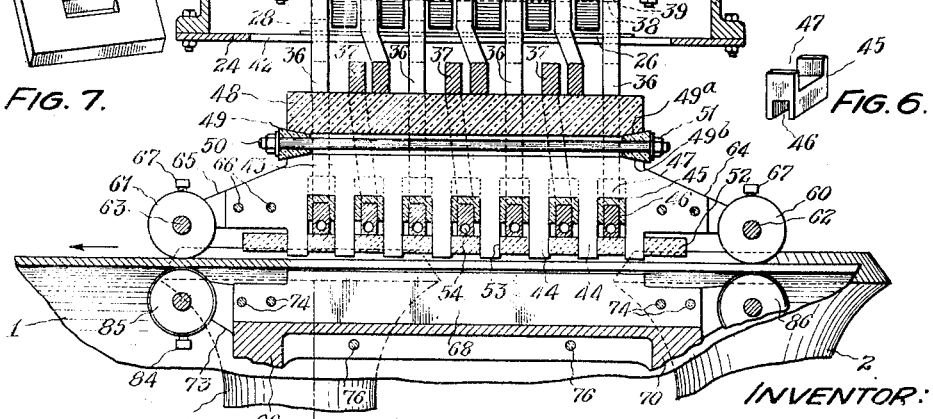
FIG. 5.
INVENTOR:

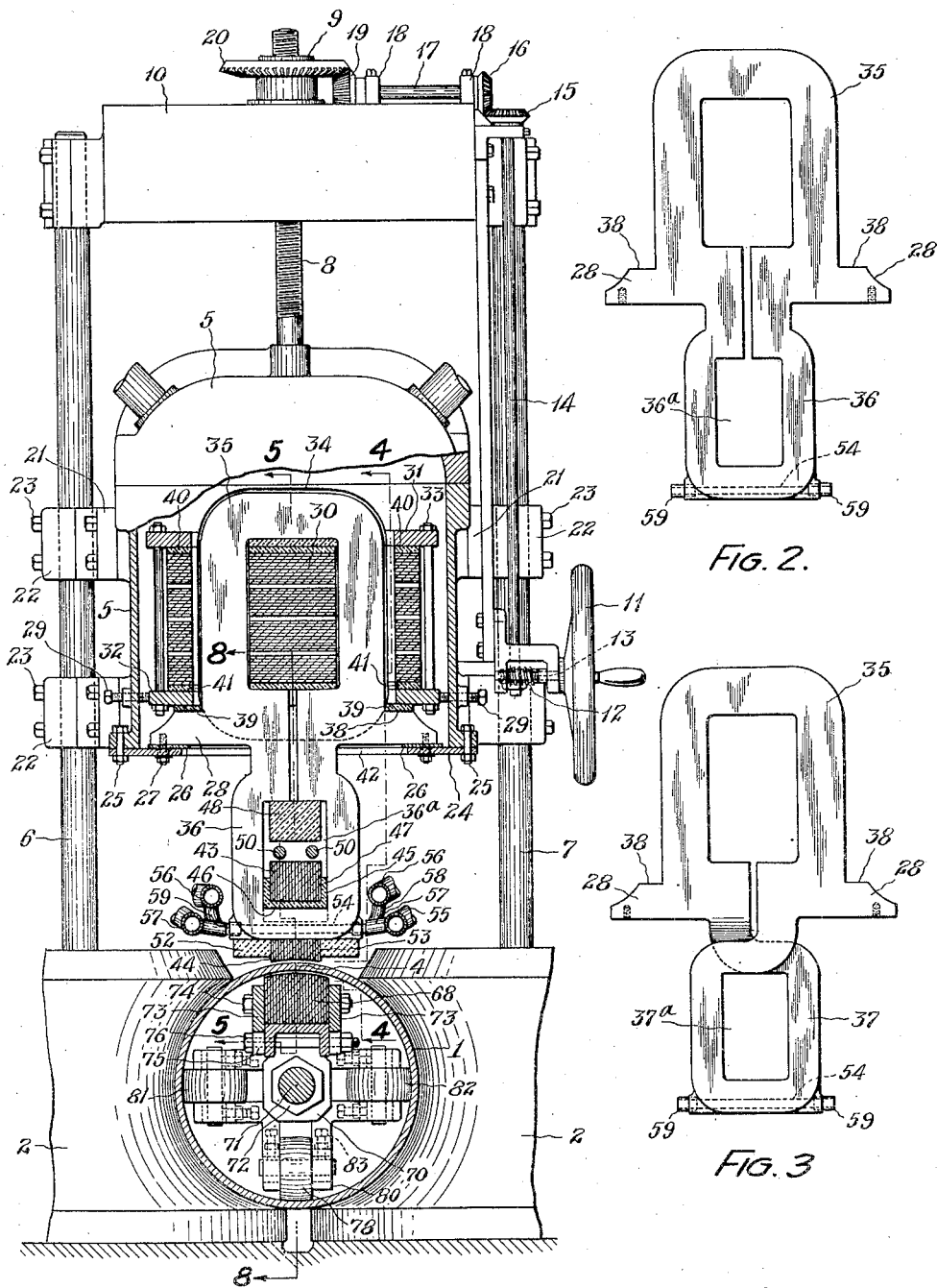

Oct. 31, 1933.    F. L. SESSIONS    1,932,423
APPARATUS FOR ELECTRIC INDUCTION WELDING AND HEATING
Filed Aug. 22, 1929    3 Sheets-Sheet 3

INVENTOR:
Frank L. Sessions

Patented Oct. 31, 1933

1,932,423

UNITED STATES PATENT OFFICE 1,932,423

APPPARATUS FOR ELECTRIC INDUCTION WELDING AND HEATING

Frank L. Sessions, Lakewood, Ohio

Application August 22, 1929. Serial No. 387,757

15 Claims. (Cl. 219—6)

My invention relates to that type of electric welding or heating in which there is no electric current conducted from the source of supply of electric current to the work but the currents which develop the heat in the work are induced in the work by rapidly alternating magnetic fields of force which are caused to pass through the metal of the work.

My invention in its preferred form comprises in general a series of successively oppositely energized induction coils, each coil adapted to set up lines of magnetic force in suitable pole pieces which extend into close proximity with the work to be welded or heated. A second series of induction coils having a series of complementary pole pieces is preferably provided on the opposite side of the work from the first named pole pieces to aid in energizing the magnetic fields of force that "cut" the work.

The principles of welding herein employed are like those utilized in my United States Patents Nos. 1,365,198 and 1,365,199.

The object of my invention is to provide improved apparatus for carrying out the processes of welding and heating disclosed in my above mentioned United States patents.

Other objects of my invention are:

The provision of apparatus for electric induction welding or heating in which the work passes through a succession of fields of rapidly alternating magnetic force, the lines of force flowing in opposite directions in adjacent fields and said fields of force being set up by alternating electric currents of preferably low voltage and any suitable frequency caused to flow through the conductor coils, each coil preferably but not necessarily having but a single turn.

The provision of means for passing a cooling fluid through the induction coils.

The provision of electric induction welding or heating apparatus in which the exposed parts of the electrical system carry a low voltage current, thus eliminating danger of injury to the operator and minimizing the chances of short circuits in the apparatus.

The provision in electric induction welding or heating apparatus of a transformer having a primary energized by suitable alternating current and closed external secondary circuits the flow of current in which sets up lines of magnetic force which induce heating currents in the work.

The provision of means for varying the air gap between the work and the pole pieces of the induction unit to vary the heating current induced in the work while the machine is in operation.

The provision of improved means for supporting a magnetic core in a tube or pipe to be welded by the electric induction method.

The provision of apparatus for heating sheets, bars, plates, or other forms of electrical conducting materials, to any desired temperature by electric current induced in such materials.

These and other objects of my invention are accomplished by the use of the mechanisms described in this specification and shown in the accompanying drawings in which:—

Fig. 1 is a vertical cross section through a machine embodying my invention.

Fig. 2 is a detached elevation of one of the transformer secondary and induction coil units.

Fig. 3 is a detached elevation of another transformer secondary and induction coil unit, the induction coils being wound opposite to that shown in Fig. 2.

Fig. 4 is a vertical longitudinal section on line 4, 4 of Fig. 1.

Fig. 5 is a vertical longitudinal section on line 5, 5 of Fig. 1.

Fig. 6 is a detached perspective view of one of the induction coil locating and insulating blocks.

Fig. 7 is a detached perspective view of the heat insulating shield member adapted to be used with this invention.

Figures 8, 9:
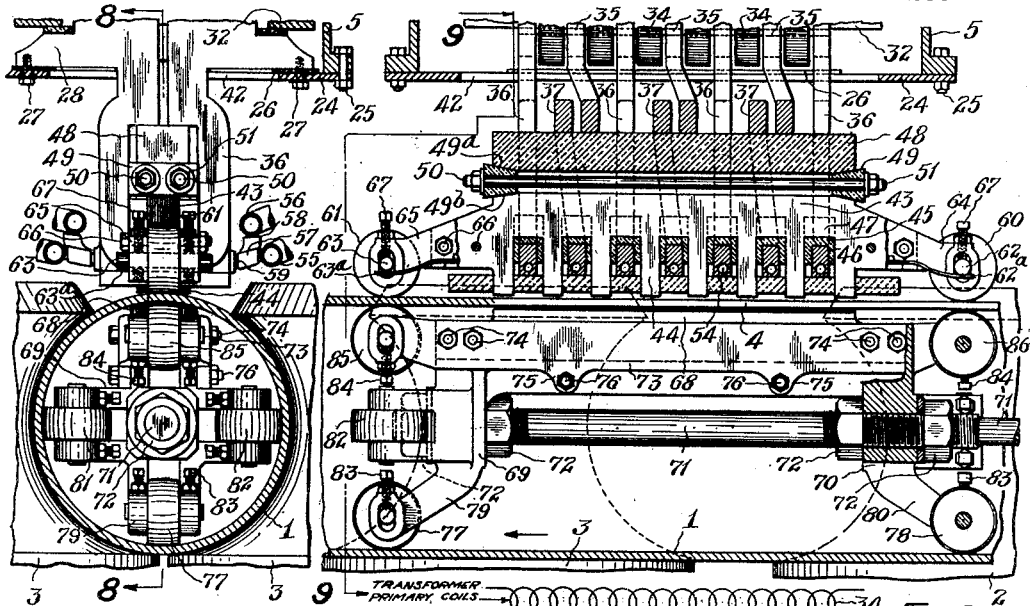
Fig. 8 is a vertical longitudinal section taken on line 8, 8 of Fig. 1, certain parts being shown in elevation.
Fig. 9 is an end elevation on line 9, 9 of Fig. 8.

The apparatus which I have shown in the drawings is adapted to progressively weld a butted seam in metallic tube or pipe. My invention is not restricted to this use however as it will be evident to those skilled in the art that it may be adapted to welding the edges of flat sheets, heating sheets or plates, or other electrical conducting material to any desired temperature and carrying out other welding or heating operations.

The pre-formed butted tube or pipe 1 is to be fed through the machine in the direction of the arrow in Fig. 4 by means of suitable pairs of feed rolls 2, 2 and 3, 3. Any suitable driving means may be provided for these rolls and I prefer that the axes of each pair be adjustable toward and away from each other to produce the proper pressure between the surfaces of the edges of the tube 1 that are to be welded. When the tube 1 is fed through the machine by the rolls 2, 2 and 3, 3 the seam 4 is preferably at the top. To insure the proper positioning of the seam 4 any suitable known seam guiding means may be used. An advantage of my invention is that because the desired heating of the work is effected by electric currents induced in the work, instead of being conducted to it by electrodes, it is not necessary to accurately position or guide the work past the induction unit. All that is necessary is that the portions of the work to be heated be so traversed through the alternating magnetic fields as to be properly affected by them.

The transformer housing 5 is supported above the tube 1 on the vertical supporting and guiding rods 6 and 7. Accurate adjustment of the transformer housing 5 is provided by means of mechanism shown in Fig. 1 which is similar to the vertical transformer adjusting mechanism shown in my United States application Serial No. 590,884. Secured to the top of the transformer housing 5 is a screw 8 which extends vertically upward and passes through a threaded nut 9 which is rotatably mounted on the supporting member 10. This supporting member 10 is secured to the vertical supporting and guiding rods 6 and 7.

To raise or lower transformer housing 5 the nut 9 is rotated by mechanism which may be operated by the hand wheel 11. A worm 12 is mounted on the hand wheel shaft and meshes with a worm gear 13 which is keyed to the lower end of a vertical drive shaft 14. At the top of shaft 14 there is mounted a bevel gear 15 which meshes with a bevel gear 16 on the horizontal shaft 17. Suitable bearings 18 for shaft 17 are provided on the supporting member 10. A bevel gear 19 is secured to the shaft 17 and meshes with a bevel gear 20 which is keyed to the rotatable threaded nut 9. Thus it will be seen that turning the hand wheel 11 will rotate the shafts 14 and 17 and the rotatable nut 9 and will raise or lower the transformer housing 5 together with the apparatus supported by it depending upon the direction in which the nut is rotated.

To aid in securely supporting and accurately guiding the transformer housing 5 in its vertical movements, bearing blocks 21 are provided. These bearing blocks 21 are bolted to the sides of the transformer housing 5 and are provided with bearing caps 22 which are held in place by bolts 23. The vertical guiding and supporting rods 6 and 7 have sliding fits in the bearing apertures formed in blocks 21 and caps 22. I have not shown independent means for securing the transformer housing 5 to prevent vertical movement as the worm 12 and worm gear 13, together with the low pitch screw 8 will prevent any vertical movement of the housing 5 except that caused by turning the hand wheel 11. It will be understood, however, that if for any reason clamping or locking means are deemed desirable they may be provided.

A step-down transformer having a low voltage large current-carrying capacity secondary preferably composed of single turn coils, 35, is supported in the housing 5 by the plate 24, which is secured to the bottom flange of the housing 5 by means of bolts 25. Strips of insulating material 26 are interposed between the plate 24 and the supporting feet 28 of the transformer secondary. Screws 27 extend up through plate 24 and insulations 26 into the supporting feet 28 of the transformer. These screws 27 are insulated from plate 24, and serve to hold the transformer in place in the transformer housing 5. To aid in locating the transformer in the proper position in the housing 5 adjustable set screws 29 may be provided. These extend through the side walls of the housing 5 and engage the core clamps 32 to prevent any lateral movement of the transformer in its housing.

The transformer structure includes the laminated core 30 which is clamped together by means of core clamps 31 and 32 and bolts 33. The primary windings 34 as shown in Figs. 4 and 5 are divided into separate coils which are interposed between loops 35 of the secondary. Extending out from the bottoms of the single turn secondary loops 35 are the supporting feet 28 which are held in their proper positions on the plate 24 by means of the insulated screws 27. In the transformer shown in the drawings, the one-turn secondary coils 35 are not connected to each other in any way although it will be understood that the coils 35 might be connected all in parallel and the induction coils 36, 37, be connected to the proper terminals of the coils 35 to make alternate poles of the induction unit opposite. I prefer to form the one-turn transformer secondaries 35 together with one-turn induction coils 36 or 37 by casting or otherwise forming them as single integral structures as shown in Figs. 2 and 3. In Fig. 2 the induction coil 36 extends down from and is cast integral with the secondary coil 35. In Fig. 3 the secondary coils 35 is exactly the same as that shown in Fig. 2 but the induction coil 37, which is cast integral with secondary 35, has its ends crossed so that current will flow through it in a direction opposite to that in coil 36. In other words induction coils 36 and 37 are "wound" in opposite directions.

When the transformer is assembled the secondary coil and induction coil units are assembled on the core 30 in such a manner that adjacent induction coils will be wound in opposite directions. This is illustrated in Figs. 4 and 5 in which induction coils of the open U type shown at 36 in Fig. 2, alternate in position with the crossed end type shown at 37 in Fig. 3.

The feet 28 on the transformer secondaries 35 are provided with shoulders 38 which, when the transformer is assembled, form supports for the core 30. Suitable insulating plates 39 may be provided for insulating the secondary coils 35 from the core clamping plate 32. The core clamping plates 31 and 32 may be insulated and magnetically disconnected from the core 30 by means of insulating plates 40 and 41.

When the transformer is assembled in the housing 5 the induction coils 36 and 37 extend downwardly through the aperture 42 in the supporting plate 24 and the openings through coils 36 and 37 will be in alignment. A laminated magnetic core 43 is provided which extends through the openings in the induction coils 36 and 37 and has laminated tooth-like pole pieces 44 extending downwardly from it between the lower portions of adjacent induction coils 36 and 37. In order to insulate the core 43 and pole pieces 44 from the induction coils 36 and 37, I prefer to support core 43 and pole pieces 44 on insulating blocks 45. Fig. 6 shows a perspective view of one of these blocks. The groove 46 in the bottom of the blocks is adapted to fit over the lower part of one of the induction coils 36 or 37 and the slot 47, cut in the top of the block, supports and locates the laminated core 43 and its pole pieces 44. The core receiving openings 36a and 37a in the induction coils 36 and 37 are made high enough to admit the core 43 and poles 44 after the insulating blocks 45 have been set in position upon the lower bars of the induction coils. After the core 43 and pole pieces 44 have been placed in the induction coils they may be secured by means of a filler block or clamp 48 which may be inserted in the openings in the induction coils above the core 43 and held there by means of tapered wedge blocks 49, which have surfaces 49a and 49b engaging corresponding surfaces upon the filler block 48 and core 43 and are adjustably held by threaded-end rods 50 and nuts 51. The rods 50 pass through holes in the blocks 49 and extend through the openings in the induction coils 36 and 37 above and parallel to the laminated core 43. When the nuts 51 are tightened the blocks 49 will be drawn together and will coact with the correspondingly tapered surfaces on the top of the laminated core 43 and bottom of the upper insulating and clamping member 48 to hold the core 43 and pole pieces 44 firmly in place on the insulating blocks 45. The above described construction also serves to hold the induction coils 36 and 37 in the proper spaced apart relation and aids in forming a rigid induction unit structure.

To protect the induction coils 36 and 37 from the heat generated in the work during the welding or other heating operation a perforated heat insulating shield 52 may be provided. As will be seen from Fig. 7, this shield 52 has a series of apertures through which the pole pieces 44 may pass. As shield 52 fits tightly around the pole pieces 44 and is preferably made of a heat insulating substance such as asbestos, it will serve to protect the induction coils 36 and 37 from the heat which radiates from the work when the machine is in operation.

As an additional means of cooling induction coils 36 and 37, fluid passages 54 may be provided which extend through the lower conductor portions of the coils and are adapted to be connected to fluid supply pipes 55 and 56 preferably by rubber hose connections 57 and 58. Short sections of pipe 59 may be secured in the ends of fluid passages 54 to facilitate attaching the hose connections 57 and 58. Any suitable cooling fluid may be circulated through pipes 55 and 56. The fluid passing through pipes 55 will pass through and cool the induction coils 36 and the fluid passing through pipes 56 will pass through and cool the induction coils 37. By providing two independent pipe systems for supplying cooling fluid to the two sets of oppositely wound induction coils 36 and 37 there is no electrical connection through the cooling fluid between the induction coils 36 and the induction coils 37.

It will be evident that the entire induction unit, comprising induction coils 36 and 37, laminated core 43 and tooth-like laminated pole pieces 44 will be supported by and adjustable with the step-down transformer and transformer housing 5. The pipe 1 constituting the work is fed through the machine by the rolls 2, 2 and 3, 3 with its seam directly below the laminated pole pieces 44 as above described and by turning the hand wheel 11 in the proper direction the pole pieces 44 may be brought down into close proximity with or lifted away from the surface of the pipe 1. As shown in Fig. 1 the ends of the pole pieces 44 may be shaped to conform to the curvature of the pipe to be welded, thus producing a uniform air gap between the pole pieces 44 and the surface of the work.

To prevent the pole pieces 44 from contacting with the work, pipe 1, I have provided rolls 60 and 61, rotatably mounted on shafts 62 and 63 which are supported by the brackets 64 and 65. Springs 62a, 63a, may be provided to yieldingly support the shafts 62, 63 when there is no work in the machine. These brackets 64 and 65 are rigidly attached by means of bolts 66 to the suitably projecting ends provided on the laminated core 43. The roll shafts 62 and 63 are held in vertical slots in the ends of brackets 64 and 65. By adjusting the screws 67 the vertical position of rolls 60 and 61 may be varied to provide the desired distance between the surface of the work and the ends of the pole pieces 44, as it is evident that when the rolls and 61 are in contact with the work the pole pieces 44 cannot be brought closer its surface. Roll 61 also assists in rolling down the outer bur which may be thrown up in the welding operation. It will be seen that rolls 60 and 61 prevent contact between the pole pieces 44 and the work and serve as adjustable stops for predetermining and maintaining the proper air gap between the pole pieces and the work.

To reduce the reluctance of the magnetic circuits of the inducing unit a laminated magnetic core 68 may be supported inside of the pipe 1, i. e., on the opposite side of the work from poles 44. This core 68 is preferably curved on its top surface for pipe work as shown in Fig. 1 and is held in position directly below the seam to be welded and opposite the pole pieces 44 in close proximity to the inside surface of the pipe 1. Core 68 may be held in its proper position by any suitable means. In the apparatus shown in the drawings, I have provided a pair of radial, roll-supporting brackets 69 and 70 which are held in place on the anchor rod 71 by the nuts 72. The core clamping members 73 extend between roll brackets 69 and 70 and are attached thereto. Bolts 74 pass through these clamping members 73 and the projecting ends of the core 68 and serve to hold core 68 firmly in place. The clamping members 73 and bolts 74 may be insulated from the core 68 and brackets 69 and 70, and from each other in known manner. Core clamping members 73 may be provided with downwardly extending ears 75 for receiving the preferably insulated bolts 76 which pass through these ears 75 and aid in holding the laminated core 68 in place between the clamping members 73. Bottom rolls 77 and 78 are rotatably mounted on shafts which are adjustably mounted for vertical movement in the downwardly extending arms 79 and 80 of roll brackets 69 and 70. A pair of horizontal rolls 81 and 82 may be rotatably and adjustably mounted on horizontally extending arms on roll-supporting bracket 69 as best shown in Fig. 9. Similar rolls may be mounted on roll-supporting bracket 70. The upper adjustable vertical rolls 85 and 86 are rotatably mounted on shafts which are supported by the extending ends of core clamping members 73.

The adjustment of vertical rolls 77, 78, 85 and 86 is provided for by means of screws 83, 84 which determine the position of the roll shafts in the same manner as screws 67 determine the position of roll shafts 62 and 63. Horizontal rolls 81, 82 may be horizontally adjusted by similar means. These roll adjusting mechanisms are best shown in the drawings in Fig. 8.

The object of adjusting the positions of these rolls is to adapt the machine to handle different thicknesses of work and different diameters of pipe. In addition, the adjustment of the upper vertical rolls 85 and 86 regulates the air gap between the inner magnetic core 68 and the work and these rolls prevent the core from contacting with the work.

The anchor rod 71 holds the entire internal magnetic core supporting apparatus comprising the rolls, roll supports, core clamps, core, etc. in longitudinally proper position in the pipe 1 so that the core 68 is directly opposite the seam to be welded and the pole pieces 44. This rod extends in the direction from which the pipe 1 is being fed and may be attached at its outer end to a thin depending plate which extends down through the open seam of the pipe to be welded. This construction is not shown in the drawings but is well known in the art. It will be understood that while the seam to be welded should be approximately in the central longitudinal plane of the pole pieces 44 and core 68, it is unnecessary when using my invention to position and guide the seam with anything like the accuracy required in progressive seam welding in which current is conducted to the work by electrodes. The inner supporting rolls such as 78, 81, 82, may be adjusted to provide a small amount of clearance inside the pipe to accommodate slight variations in size or thickness of the pipe and avoid frictional resistance.

Figure 10:
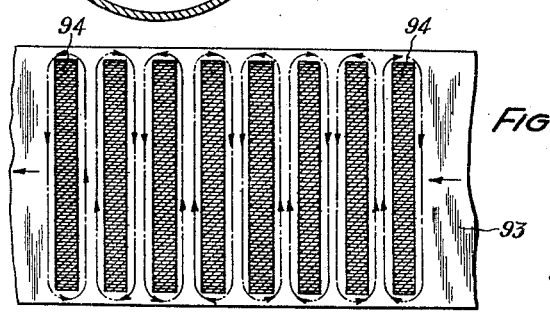
Fig. 10 is a view similar to Fig. 9 but showing a modified form of my invention having interior and exterior guide rolls straddling the seam instead of contacting therewith.

Fig. 10 is a view similar to Fig. 9 but showing a modified form of my invention in which exterior guide rolls 87 and 88 straddle the seam. These two rolls 87 and 88 have the same function as the single roll 61 in the preferred form of my invention. A second pair of guide rolls may be similarly mounted on the opposite end of the laminated core member 43 to take the place of single roll 60 in the preferred form of my invention. If desired, however, a pair of straddling rolls such as 87 and 88 may be provided at one end of the laminated core and a single roll such as 60 or 61 may be mounted on its other end. By means of the straddling roll construction illustrated in Fig. 10 it is possible to avoid having the guide rolls contact with the bur which is thrown up at the seam in the welding operation.

The inside guide rolls 89, 90, 91 and 92, shown in Fig. 10, are carried by the internal core supporting carriage 93 in a manner similar to rolls 77, 81, 82 and 85 shown in Fig. 9. However, instead of rotating in vertical and horizontal planes they are shown mounted for rotation in planes 45 degrees from the vertical. By mounting the internal guide rolls in this manner rolls 89 and 90 are positioned directly under external guide rolls 87 and 88 and are thus adapted to aid in supporting any load which may be imposed upon the pipe 1 through the rolls 87 and 88. These rolls 87, 88, 89, 90, 91 and 92 may all be adjustably mounted in a manner similar to and for the same purpose as rolls 60, 61, 77, 78, 81, 82, 85 and 86.

Figure 11:
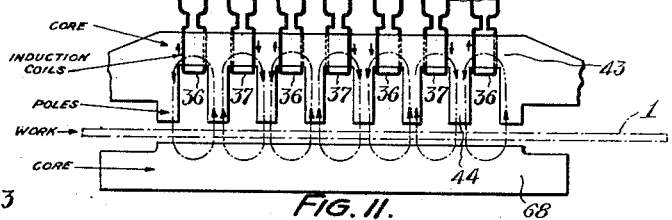
Fig. 11 is a diagrammatic view showing the paths and direction of lines of force set up by the induction coils.
Figure 12:
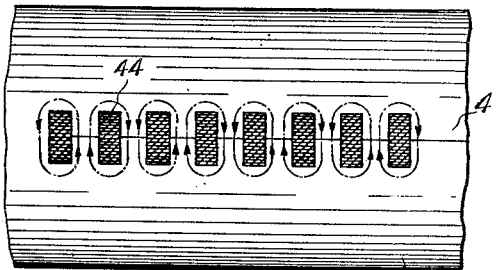
Fig. 12 is a diagrammatic plan view of the work and the pole pieces showing instantaneous paths of current induced in the work.

The primary transformer coils 34 may be connected together in either series or parallel relation and may be energized by any suitable source of alternating electric current. When they are so energized they will induce currents in the adjacent one-turn secondary coils 35. The current which is induced in these secondary coils 35 will flow through the closed induction coils 36 and 37 which are preferably cast or otherwise made (at least for electrical conductivity) integral with the coils 35. Fields of magnetic force will be set up by induction coils 36 and 37 and, as the coils are wound in successively opposite directions, the lines of magnetic force induced thereby will pass through the magnetic core 43, pole pieces 44, pipe 1 and core member 68 as illustrated in the diagrammatic view Fig. 11. In this view the dotted lines and arrow-heads show the paths and directions of flow of the lines of magnetic force. As these lines of magnetic force pass through the metal of the pipe 1 they will set up electric currents in the pipe which will flow around the projections of the ends of pole pieces 44 as indicated by the arrows in diagrammatic plan view Fig. 12. From this view it will be seen that current will flow across the contacting seam edges in spaced apart paths in which paths heat will be developed. The shorter the pitch of the poles the shorter will be the time required for the work to pass from one current path or heating zone to the next. The direction of the current flowing across the seam in any given path at any particular instant will be opposite to the direction of the current flowing across the seam in the immediately adjacent current paths at the same instant. It will be observed that if the work be magnetic the hysteresis losses will aid in heating it.

Thus as the pipe is fed through the successively opposite fields of magnetic force the currents and hysteresis set up in the metal of the pipe thereby will produce a cumulative heating effect which will be greatest at the point of greatest resistance, that is, the contacting seam edges. It will be evident to those skilled in the art that the strength of the magnetic fields and the speed of travel of the work may be so correlated that the seam edges will reach the welding temperature as or just before they pass through the last magnetic field. The rolls 3, 3 are so located and mounted that they may be adjusted to create the proper pressure between the seam edges at about this point to cause them to be welded together.

I do not limit my invention to the specific number of induction coils and poles shown in the accompanying drawings as in some instances, as will be understood, it may be desirable to have more or less than I have illustrated. The heating effect $I^2R$, of the currents set up in the metal of the work is dependent upon the frequency and strength of the magnetic fields which pass through the work. The strength of the magnetic fields passing through the work may be varied in a number of ways among which are varying the strength of the current in the primary transformer coils 34, varying the air gap between the ends of pole pieces 44 and the work or varying the air gap between the laminated core 68 and the work. The strength of the current in the induction coils may be varied by any known means, such as varying the primary voltage applied to the step-down transformer by means of a variable voltage generator or by compensators, rheostats or auto-transformers well known in the art.

Figure 13:
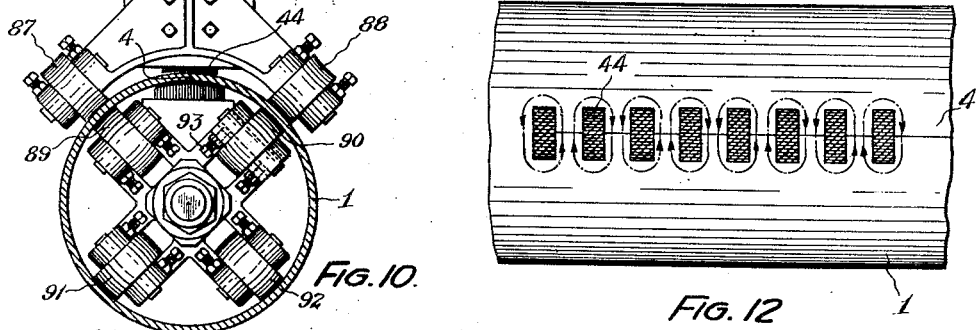
Fig. 13 is a diagrammatic plan view similar to Fig. 12 but showing a modification of my invention suitable for heating sheet metal.

Fig. 13 is a diagrammatic view showing how my invention may be applied to heating sheet metal, 93. Apparatus for carrying out this operation may be similar to the tube welding apparatus herein described except that the pole pieces 94 should be approximately as wide as the sheet to be heated and the laminated core on the opposite side of the work from the pole pieces should be of the same width as the pole pieces. It will be understood that the poles and core may be enough narrower than the work to permit the currents induced in the work to flow around the magnetic fields which induce them.

It will be understood that suitable means will be provided to support the poles and cores in proper relation to each other and to the work. In general these means may be similar to the means shown in Figs. 1, 4, 5, 8 and 9, but modified to be adapted to support the suitably modified poles and cores in proper relation to the flat work being treated.

The currents set up by the lines of force which pass through the work when composed of a plate or sheet travel in the paths indicated by the arrows in Fig. 13 and the resistance of the metal to the flow of currents produces a cumulative heating effect over the entire width of the sheet. As there is no seam and the resistance of the metal of the sheet is substantially uniform throughout its width, the heating effect will not be mostly developed at one point in the path of the current as it is at an open seam in the work in welding operations but the entire sheet will be uniformly heated as it passes through the successively opposite rapidly reversing fields of force.

My copending application Serial 377,423, filed July 11, 1929, discloses many of the features utilized in this invention. Such features as are common to the two applications will be claimed in Serial 377,423, and only claimed herein in combination with the specific features of this invention.

I claim:

1. Apparatus for welding a seam in metal by the electric induction method comprising an alternating current transformer having a primary coil and a secondary coil, said primary coil being adapted to be energized by alternating electric current, an induction coil connected to the terminals of said secondary coil, a laminated magnetic core extending through said induction coil and having pole pieces extending into close proximity to but removed from said metal adjacent to said seam, a second laminated magnetic core disposed on the other side of said metal from said pole pieces, means for varying the distance between said pole pieces and said metal and means for causing relative traversing movement of said metal and said pole pieces.

2. Apparatus for welding a longitudinal seam in pre-formed metallic pipe comprising an alternating current transformer having a primary coil and a secondary coil and adapted to be supported adjacent to said pipe, said primary coil being adapted to be energized by alternating electric current, an induction coil electrically connected to and supported by said secondary coil, a magnetic core adapted to extend through and be supported by said induction coil, said magnetic core having poles adapted to be positioned in close proximity to said pipe, means for varying the distance between said magnetic poles and said pipe, means for causing relative traversing movement between said poles and said pipe in a direction parallel to said seam and means for causing welding pressure between the edges of said seam.

3. In apparatus of the class described, a transformer having a primary coil and a secondary coil, said primary coil being adapted to be energized by alternating electric currents, an induction coil connected to said secondary coil, a magnetic core for said induction coil having poles presented to the work, means for causing relative traversing movement of the work and said poles, and means for simultaneously moving said magnetic core and poles to vary the distance between said magnetic poles and the work.

4. In apparatus of the class described, a transformer having a primary coil and a secondary coil, said primary coil being adapted to be energized by alternating electric current, an induction coil connected to said secondary coil, a magnetic core for said induction coil having poles presented to the work, and means for simultaneously moving said magnetic core and poles to vary the distance between said magnetic poles and the work.

5. In an apparatus of the class described, a transformer embodying a core and primary and secondary coils surrounding said core, an induction coil electrically connected to each of said secondary coils, another magnetic core extending through said induction coils, and means for fastening the same therein, this latter core being provided with poles terminating adjacent the work, and another magnetic member arranged opposite said poles and at the other side of the work.

6. In an apparatus of the class set forth, a transformer embodying a magnetic core, a series of alternately arranged primary and secondary coils on said core, each secondary coil being electrically connected to an induction coil, adjacent induction coils being wound in opposite directions, another magnetic core mounted in said induction coils and having poles terminating adjacent the work, and another magnetic member arranged opposite said poles and at the other side of the work.

7. In an apparatus of the class set forth, a transformer embodying a magnetic core, a plurality of alternately arranged primary and secondary coils on said core, each secondary coil consisting of a single coil, and a series of induction coils cast integral with the ends of said secondary coils and each consisting of a single winding, the alternate induction coils being wound in opposite directions, another magnetic core extending through the induction coils and provided with pole pieces extending into close proximity to the work, said latter core being provided with adjusting means for positioning the poles with respect to the work, another magnetic member arranged opposite said poles at the oposite side of the work, the later member being mounted on a movable carriage provided with means for engaging the work to thus position this magnetic member with respect to the work.

8. In apparatus of the class set forth, a work support, a magnetic member having poles terminating adjacent the work on said work support, means for supporting said magnetic member, another magnetic member spaced from said poles and disposed at the other side of the work, means for supporting said latter magnetic member, means for varying the distance between said poles and said latter magnetic member, means for causing relative traversing movement of said work and said magnetic members, an induction coil on one of said magnetic members, said induction coil being adapted to be energized by alternating electric current, the axis of said induction coil being substantially parallel to the direction of said movement, said induction coil having a portion arranged adjacent said work, and a conduit for cooling fluid in said portion.

9. In apparatus of the class set forth, a transformer support, a work support, a transformer mounted on said transformer support, means for moving said transformer towards and from the work on said work support, said transformer embodying a magnetic core, a primary and a secondary coil on said core, an induction coil electrically connected to said secondary coil and supported for movements with said transformer towards and from the work on said work support, another magnetic core mounted in said induction coil and having poles terminating adjacent the work on said work support, and a magnetic member arranged opposite said poles and at the other side of the work.

10. In apparatus of the class set forth, a transformer support, a work support, a transformer mounted on said transformer support, means for moving said transformer towards and from the work on said work support, said transformer embodying a magnetic core, a primary coil and a secondary coil on said core, a plurality of aligned induction coils electrically connected to said secondary coil and supported for movement therewith towards and from the work on said work support, adjacent induction coils being electrically connected to have their magnetic fields opposed, another magnetic core mounted in said induction coils and having poles between said induction coils terminating adjacent the work on said work support, and a magnetic member arranged opposite said poles and at the other side of the work.

11. In apparatus of the class set forth, a transformer support, a work support, a transformer mounted on said transformer support, means for moving said transformer towards and from the work on said work support, said transformer embodying a magnetic core, a primary coil and a secondary coil on said core, an induction coil electrically connected to said secondary coil and supported for movements with said secondary coil towards and from the work on said work support, and another magnetic core mounted in said induction coil and having poles terminating adjacent the work.

12. In apparatus of the class set forth, a transformer support, a work support, a transformer mounted on said transformer support, means for moving said transformer towards and from the work on said work support, said transformer embodying a magnetic core, a primary coil and a secondary coil on said core, and an induction coil electrically connected to said secondary coil and supported for movements with said secondary coil towards and from the work on said work support.

13. In apparatus of the class set forth, a transformer support, a work support, a transformer mounted on said transformer support, means for moving said transformer towards and from the work on said work support, said transformer embodying a magnetic core, a primary winding and a secondary winding on said core, a plurality of aligned induction coils electrically connected to said secondary winding and supported for movements with said secondary winding towards and from the work on said work support, adjacent induction coils being electrically connected to have their magnetic fields opposed.

14. In apparatus of the class set forth, a transformer support, a work support, a transformer mounted on said transformer support, means for moving said transformer towards and from the work on said work support, said transformer embodying a magnetic core, a primary winding and a secondary winding on said core, a plurality of aligned induction coils electrically connected to said secondary winding and supported for movements with said secondary winding towards and from the work on said work support, adjacent induction coils being electrically connected to have their magnetic fields opposed, and another magnetic core mounted in said induction coils and having poles between said induction coils terminating adjacent the work.

15. In apparatus of the class set forth, a transformer support, a work support, a transformer mounted on said transformer support, means for varying the distance between said transformer and the work on said work support, said transformer embodying a magnetic core, a primary coil and a secondary coil on said core, said primary coil being adapted to be energized by alternating electric current, an induction coil electrically connected to said secondary coil and supported with said transformer, another magnetic core, mounted in said induction coil and having poles terminating adjacent the work on said work support, a magnetic member arranged opposite said poles and at the other side of the work, means for supporting and positioning said magnetic member with respect to the work including roller means engaging the work.

FRANK L. SESSIONS.